M. J. WEBER.
WEIGHING AND MEASURING DEVICE.
APPLICATION FILED MAY 29, 1920.

1,383,505.

Patented July 5, 1921.

Witnesses:
W. F. Kilroy
Harry R. L. White

Inventor:
Mathias J. Weber
By Murray Lotz & Wilson
Attys

UNITED STATES PATENT OFFICE.

MATHIAS J. WEBER, OF CHICAGO, ILLINOIS, ASSIGNOR TO CONTINENTAL SCALE WORKS, OF CHICAGO, ILLINOIS, A CORPORATION OF ILLINOIS.

WEIGHING AND MEASURING DEVICE.

1,383,505.   Specification of Letters Patent.   Patented July 5, 1921.

Application filed May 29, 1920. Serial No. 385,108.

*To all whom it may concern:*

Be it known that I, MATHIAS J. WEBER, a citizen of the United States, and a resident of Chicago, in the county of Cook and State of Illinois, have invented certain new and useful Improvements in Weighing and Measuring Devices, of which the following is a specification.

My invention relates to improvements in combined weighing and measuring devices and has special reference to scales particularly adapted for weighing persons for simultaneously ascertaining the height of the persons being weighed.

The usual range of height for which such devices are arranged is a minimum of 39" and a maximum of 78". Heretofore, so far as I am informed, upon scales of this character which consist of what is known as platform scales having a fixed post or standard rising from one end and a balance lever at the top of the standard upon which the weight of the person can be read from the front of the scale, the measuring device has been arranged in front of the standard and the operation of ascertaining the weight and height of the person required the operator to stand beside the person being weighed and to read the weight and height as best he might, but with the difficulty that the body of the person being weighed and measured covered the indications more or less and rendered the accurate reading thereof rather difficult. Furthermore the available height for the measuring device is somewhat limited when this device is placed in front of the standard and it is difficult to provide a simple measuring device in this position which shall be capable of extending from 39" to 78".

The object of my invention is to provide a combined weighing scale and height measuring device which shall be so arranged that the operator can readily and accurately see the weight and height scales when weighing and measuring a person: in which the height measuring device shall consist of two simple telescopic members showing the height measurement always at a definite or fixed point.

Another important feature of my invention relates to a modified form of balancing lever which permits the adjustment of the height measuring device to the minimum height and the positioning of the head contacting arm over this lever without interfering therewith.

A further feature relates to the provision of scales to be read both from the front and the rear of the device so that both the operator and the one being measured can read the height and the weight.

Other features, advantages and benefits, as well as the construction and operation of the device will be made clear in the following detail description, taken in conjunction with the accompanying drawings forming part of this specification, and in which:—

Figure 1:
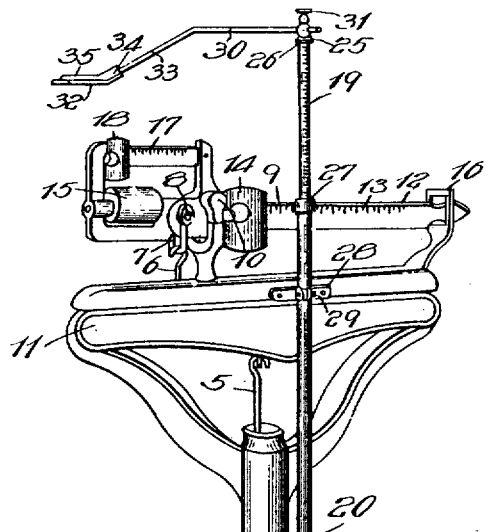
Figure 1 is a perspective view, from the rear, of a combined weighing and measuring device made in accordance with my invention.
Figure 2:
Fig. 2 is a fragmentary enlarged perspective view of one element of the height measuring device showing the two series of height indications, one on the front and the other on the rear of the element.
Figure 4:
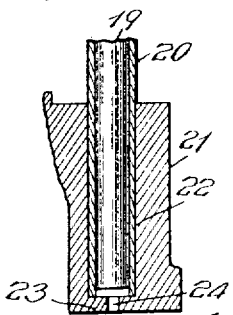
Fig. 4 is a top view of the contact plate at the free end of the height measuring arm.
Figure 3:
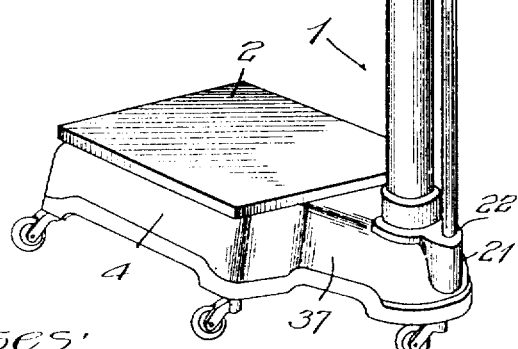
Fig. 3 is a fragmentary vertical section of the base of the scale through the height measuring device.

In said drawings, 1 represents a platform scale which is illustrated as being mounted upon a plurality of casters, so that the scale can be readily moved about from place to place. As is usual in such scales, it is provided with a platform 2 upon which the person stands to be weighed and measured. A standard 3 rises from one end of the base 4 and through which the connecting rod 5 extends to carry the weight indications through suitable mechanism to a link 6 which is linked into a U-shaped member 7 hung on knife edge supports 8 fixed in a balance lever 9. The balance lever 9 is held on suitable supports in a rigid bracket 10 rising from the frame or yoke 11 fixed on the top of the standard 3. The balance lever 9 has a horizontal scale arm 12 which is provided with a weight indicating scale 13 divided into ten pound minimum divisions and which preferably runs up to approximately 300 lbs. maximum. A sliding weight 14 on this arm is arranged to indicate the weight by ten pound increments. On the rear end of this lever is arranged an adjustable weight 15 for accurately setting the scale to zero or no weight condition. The forward end of the arm 12 enters an opening in a guide 16 which prevents the displacement of the arm and leaves it free to show when the scale is in a balanced condition.

Above and adjacent to the adjusting weight 15 I arrange a short scale bar 17 having a small sliding weight 18 adapted to indicate a minimum of 10 pound weight when moved forward to the inner end of this bar, and by increments of very small divisions of weight so that I am enabled to determine accurately the weight of the person being weighed between the ten pound divisions shown on the arm 12.

The usual construction is to provide two weight indicating bars or levers of equal length, one showing several hundred pounds and the other indicating a maximum weight of 50 lbs. by small increments, but the form I have devised is particularly useful in relation to the height measuring means of my invention. These two bars 12 and 17 are provided with weight indications on the front and their rear faces which are exactly alike and by which a person standing either behind the scale or on the platform of the scale in front of the arms can easily read the weight indications.

For measuring the height of the person being weighed I provide a measuring rod 19 mounted to slide vertically in a tubular guide or support 20 fixed on the scale at the rear of the standard and standing up parallel with the standard 3.

The lower end 21 of the tubular guide 20 is received in a socket 22 formed in the base 4, which socket extends from substantially the lower side or bottom of the base to the top surface thereof. The socket has a thin integral bottom wall 23 upon which the tube 20 rests and is supported, and I provide the bottom wall with an opening 24 which permits free passage of air into and out of the tube as the rod 19 is raised or lowered and permits any moisture which might condense or collect within the tube to freely drain out. The upper end of the rod 19 is provided with a knob 25 provided with a bottom shoulder 26 which rests upon the upper end of the tube 20 when the rod is in its lower position, and I provide the upper end of the tube with a fixed collar 27 to provide a finished end to same and to provide an upper surface which forms the indicator by which to read the height. The tube 20 is held rigidly in position by a clamping bracket 28 secured to and projecting from the side of the yoke 11 at the upper end of the standard 3 and adapted to be tightly clamped upon the tube by a clamping bolt 29.

In the knob 25 at the upper end of the indicating rod 19 is secured a horizontal rod 30 which is received in a horizontal hole provided in the knob and is secured against movement therein by a set screw 31. This arm is provided with a plate 32 adapted to project over the platform 2 and to be rested upon the top of the head of the person being measured in order to determine the height of the person. The free end 33 of the rod 30 is bent downwardly at an angle of substantially 45 deg. and the rear end of plate 32 is provided with a boss 34 in which the free end of the rod 30 is received and rigidly held. The under or head contacting surface of the plate 32 extends horizontally and at right angles to the rod 19 so that it is parallel with the platform 2. I provide the upper surface of the plate 32 with a central longitudinal stiffening rib 35 which also serves to indicate that the plate should not be turned over or upside down for use. The offset of the plate 32 below the shoulder 26 brings a minimum height which can be measured just that much below the top of the indicating collar 27. The scale as a whole is designed for convenience in operation, that is for manipulating the weights, etc., and for reading the various indications both when the operator is seated in a chair and when standing up. If the standard 3 and the parts carried thereby were made short enough to avoid the downward offset of the contact plate 32 then the various readings would be too low for convenient reading when the operator stood up. Furthermore, they would be too low for the person being weighed to conveniently read them. But in addition to this detriment, the tube 20 would be too short to contain sufficient length of rod to permit the lifting of the rod 19 high enough to measure the maximum height desired, viz. 78″. It will be understood that if the minimum height measured is 39″ and is indicated when the knob 25 is in contact with the collar 27, that the length of rod contained in the tube 20 at such time must be 39″ plus the length of rod which it is necessary to leave in the tube for steadying the rod when the rod is drawn out for the maximum height. It will thus be understood that the total length of the tube 20 must be about 45″ for a minimum measurement of 39 inches and a maximum of 78 inches. Some of this extra length, substantially about 4″, of the tube is attained by the depth of the base as the tube, on account of being placed at the rear of the standard 3, can extend practically to the bottom of the base or four inches below the level of the platform 2. This extra length of tube could not be provided if the tube were in front of the standard, as the tube would then interfere with the levers extending through the neck 37 of the base of the platform to the standard 3. This is an important advantage which I obtain by placing the tube to the rear of the standard. The rest of the extra height is attained by the offset of the contact plate 32 below the top of the tube, this amount being substantially 2″. Furthermore, the upper surface of the collar 27 on the upper end of the tube 20 can be seen from the front of the device over the arm 12 and I provide the rod with two similar series of measured graduations 38, one on the rear side for the operator and one on the forward side for the person being measured.

The adjustable members of the device can readily be operated by a person while seated at the rear of the machine and the several indications are at a suitable height to be readily read off from this position. This is a great convenience in school work as it facilitates the work, and the record book can be in convenient position upon a table at the side of the operator. If the operator desires to work while standing, the various adjustable members are not too low to be easily manipulated and the indications can be as readily read from a standing position.

As many modifications of my invention will readily suggest themselves to one skilled in the art I do not limit or confine my invention to the specific details of construction herein shown and described.

I claim:

1. In a combined weighing and height measuring device, a base, a platform on the base upon which the person stands to be weighed and measured, a standard rising from the base adjacent to the platform and carrying on its upper end suitable weight indicating means suitably connected to the platform, a telescopically extensible measuring device rising from the base at the rear of and secured to said standard and provided with a horizontally extending arm at its upper end adapted to extend over said weight indicating means for contact with the top of the head of the person being measured.

2. In a device of the kind described, a platform scale having a standard rising adjacent to the platform, a horizontally extending weight indicating lever at the top of the standard, a height indicating rod arranged at the rear side of and parallel with said standard, a vertical tubular support fixed at the rear of the standard and in which the rod is movable, the upper end of the tube arranged at substantially the level of the upper edge of said lever and adapted to indicate height on said rod, a head contacting arm carried by the upper end of the rod and having its head contacting surface offset below the upper end of the tube for use in measuring minimum heights.

3. In a device of the kind described, a platform scale having a standard rising adjacent to the platform, a horizontally extending weight indicating lever at the top of the standard, a tubular support arranged at the rear of the standard and extending from the bottom of the base to the upper edge of said weight indicating means, a height indicating rod telescopically supported in said tube, a head contacting arm carried by the upper end of the rod and having its head contacting surface offset below the upper end of the tube and adapted to be extended over said weight indicating lever for contact with the top of the head of the person being measured, said rod having two series of weight indications, one on the rear side and one on the front side thereof.

4. In a device of the kind described, a platform scale having a standard rising from the base of the scale adjacent to one end of the platform and carrying weight indicating levers at the upper end of the standard, said levers comprising a relatively long lever for indicating large weights and a relatively short lever arranged above one end of the long lever for indicating weights of small amounts, a tubular support arranged at the rear of the standard and extending from substantially the bottom of the base to the top of the long lever, a height indicating rod telescopically supported in said tubular support and having an arm extending horizontally from the upper end thereof adapted to be swung over said long lever, said height indicating arm having a head contact plate offset below the upper end of said tubular support for use in indicating minimum heights.

5. In a device of the kind described, a base having an appreciable depth, a platform above the base, a vertical standard on one end of the base carrying suitable weight indicating means at its upper end, levers extending through the base to the standard, a height indicating rod arranged at the rear of the standard, a tubular support for the rod, the lower end of the tubular support extending substantially to the bottom of the base and secured in a socket therein and its upper end arranged substantially on the level of the weight indicating means at the top of the standard to permit the use of a maximum length of rod and to permit the reading of the height measurement from the front as well as from the rear of the device.

6. In a combined weighing and height measuring device, a base, a platform on the base on which a person stands to be weighed and measured, a standard rising from one end of the base and carrying suitable weight indicating means at its upper end, an adjustable height measuring rod arranged at the rear of the standard and having an arm extending over said weight indicating means, the free end of the arm having a head contacting portion arranged to be depressed below the top of said weight indicating means in measuring persons of less height than said weight indicating means.

Signed at Chicago, Illinois, this 24th day of May, A. D. 1920.

MATHIAS J. WEBER.